(12) United States Patent
Huang

(10) Patent No.: US 9,592,878 B2
(45) Date of Patent: Mar. 14, 2017

(54) SCOOTER-TYPE VEHICLE

(71) Applicant: YAMAHA HATSUDOKI KABUSHIKI KAISHA, Iwata-shi, Shizuoka (JP)

(72) Inventor: Chiming Huang, Taoyuan (TW)

(73) Assignee: YAMAHA HATSUDOKI KABUSHIKI KAISHA, Iwata-shi, Shizuoka (JP)

( * ) Notice: Subject to any disclaimer, the term of this patent is extended or adjusted under 35 U.S.C. 154(b) by 20 days.

(21) Appl. No.: 14/921,273

(22) Filed: Oct. 23, 2015

(65) Prior Publication Data
US 2016/0114851 A1    Apr. 28, 2016

(30) Foreign Application Priority Data

Oct. 24, 2014 (CN) .......................... 2014 1 0575615
Mar. 9, 2015 (CN) .......................... 2015 1 0102596

(51) Int. Cl.
| | |
|---|---|
| B62K 23/02 | (2006.01) |
| B62K 11/14 | (2006.01) |
| B62J 7/02 | (2006.01) |
| B62J 17/06 | (2006.01) |
| B62K 11/10 | (2006.01) |
| B62H 5/02 | (2006.01) |

(52) U.S. Cl.
CPC ................ B62K 11/14 (2013.01); B62H 5/02 (2013.01); B62J 7/02 (2013.01); B62J 17/06 (2013.01); B62K 11/10 (2013.01); B62K 23/02 (2013.01); B62K 2202/00 (2013.01)

(58) Field of Classification Search
CPC ........ B62K 11/14; B62K 23/02; B62K 11/10; B62H 5/02; B62J 17/06
See application file for complete search history.

(56) References Cited

U.S. PATENT DOCUMENTS

| | | |
|---|---|---|
| 2008/0030041 A1 | 2/2008 | Kurihara |
| 2014/0110961 A1 | 4/2014 | Hughes |

FOREIGN PATENT DOCUMENTS

| | | |
|---|---|---|
| EP | 2457813 A2 | 5/2012 |
| EP | 2489582 A2 | 8/2012 |
| JP | 2003-205879 A | 7/2003 |

(Continued)

OTHER PUBLICATIONS

Concise explanation of the Taiwanese Office Action and an English translation of the Search Report dated Jan. 20, 2016.

*Primary Examiner* — Kevin Hurley
*Assistant Examiner* — Gabriela C Craciun
(74) *Attorney, Agent, or Firm* — Rabin & Berdo, P.C.

(57) ABSTRACT

A scooter-type vehicle including a front wheel, a steering mechanism, a vehicle frame, a saddle, a vehicle cover and a main switch unit. The vehicle frame includes a head pipe, a front frame and a rear frame. The front frame extends rearwards and downwards from a rear portion of the head pipe, and, in a front view, overlaps the front wheel when the steering mechanism is in a non-rotating state. The vehicle cover includes a flat-shaped pedal or footboard, which is further forwards than the saddle above the rear frame, and a front cover extending upwards from a front end of the flat-shaped pedal or footboard. In a side view, at least a part of the main switch unit is further forwards than an imaginary line connecting a rear end of an upper edge of the head pipe and a rear end of a lower edge of the front frame.

19 Claims, 8 Drawing Sheets

(56) References Cited

FOREIGN PATENT DOCUMENTS

| | | | |
|---|---|---|---|
| TW | I338650 | B | 3/2011 |
| TW | I449646 | B | 8/2014 |
| TW | I453142 | B | 9/2014 |

SCOOTER-TYPE VEHICLE

CROSS-REFERENCE TO RELATED APPLICATIONS

This application claims the priority, under 35 U.S.C. 119, of corresponding Chinese Patent Application Nos. 201410575615.7 and 201510102596.0, respectively filed Oct. 24, 2014, and Mar. 9, 2015, which are hereby incorporated by reference in their entirety.

BACKGROUND OF THE INVENTION

Field of the Invention

The present invention relates to a scooter-type vehicle, and in particular, to configuration of a main switch of such a vehicle.

Description of Related Art

Conventionally, a scooter-type vehicle having a flat-shaped pedal is known. The scooter-type vehicle having a flat-shaped pedal can be highly comfortable because a large foot placing space in a left-right direction of the vehicle can be ensured.

JP 2003-205879 A discloses a scooter-type vehicle having a flat-shaped pedal. The scooter-type vehicle has a main switch that includes at least a key insertion cylinder and a body and has a certain degree of size. The main switch is disposed in a cover portion, the cover portion extending upwards from a front end of the flat-shaped pedal, which defines a front end of the foot placing space, and extends to the side of a head pipe.

In the scooter-type vehicle of JP 2003-205879 A having a flat-shaped pedal, the main switch that includes at least the key insertion cylinder and the body and that has a certain degree of size is disposed in the cover portion that extends upwards from the front end of the flat-shaped pedal, which defines the front end of the foot placing space, and extends to the side of the head pipe. Therefore, the scooter-type vehicle having a flat-shaped pedal of JP 2003-205879 A can effectively make flexible use of space at the side of the head pipe, so that the foot placing space may not be limited by the disposition of the main switch, thereby ensuring the size of foot placing space in a front-rear direction. Therefore, a flat-shaped pedal having large foot placing space in a left-right direction can also ensure the size of the foot placing space in the front-rear direction, and it is highly comfortable for the rider.

On the other hand, in the scooter-type vehicle having a flat-shaped pedal, to further improve a rider's comfort, storing space for storing and taking articles when the rider is in a riding state is expected to exist. In addition, in a case of considering convenience of storing and taking articles in the storing space when the rider is in the riding state, preferably, the storing space is disposed in the cover portion that extends upwards from the front end, which defines the front end of the foot placing space, of the flat-shaped pedal.

However, in the vehicle of JP 2003-205879A a main switch unit is also disposed in the cover portion that extends upwards from the front end, which defines the front end of the foot placing space, of the flat-shaped pedal. Therefore, if a main switch unit having a certain degree of size and the storing space are both disposed in the cover portion that extends upwards from the front end of the flat-shaped pedal, which defines the front end of the foot placing space, the cover portion that extends upwards from the front end of the flat-shaped pedal, which defines the front end of the foot placing space, may be located further rearward, so that the foot placing space of a pedal may be reduced in a front-rear direction. Consequently, the size of the foot placing space in the front-rear direction may be reduced, thereby reducing the comfort of the rider.

In view of this, the present invention has been developed through research, and an objective of at least one embodiment thereof is to provide a scooter-type vehicle, that is highly comfortable for a rider, and can ensure foot placing space of a flat-shaped pedal in a front-rear direction, whilst also ensuring storing space for storing and taking articles when the rider is in a riding state.

It is an object of at least one embodiment of at least one aspect of the present invention to obviate or at least mitigate one or more problems or disadvantages in the prior art.

BRIEF SUMMARY OF THE INVENTION

Various aspects of the present invention are defined in the independent claims. Some preferred features are defined in the dependent claims.

According to a first aspect of the present invention is a scooter-type vehicle. The vehicle may comprise a front wheel. The vehicle may comprise a steering mechanism which may include a handle for a rider to operate. The steering mechanism may support a front wheel. The vehicle may comprise a vehicle frame, which may include a head pipe, a front frame portion, and/or a rear frame portion. The head pipe may rotatably support the steering mechanism and may extend forwards and the downwards, e.g. with respect to the vehicle. The front frame portion may extend rearwards and downwards, e.g. with respect to the vehicle, from a rear portion of the head pipe. In a front view, the front rear portion may be disposed overlapping the front wheel when the steering mechanism is in a non-rotating state. The rear frame portion may extend rearwards from a lower portion of the front frame portion. The vehicle may comprise a saddle portion which may be supported by the rear frame portion. The vehicle may comprise a vehicle cover which may include a pedal or footboard, such as a flat-shaped pedal or footboard and may include a front cover portion. The pedal or footboard may be located further forward than the saddle portion. The pedal or footboard may be located above, directly above or overhead of, the rear frame portion, and may be used by the rider sitting on the saddle portion to place feet on. The front cover portion may extend upwards from a front end of pedal or footboard. At least a part of the front cover portion may be located to the rear, e.g. directly behind or directly backward of, the head pipe and/or the front frame portion. The vehicle may comprise a main switch unit, which may include a main switch portion. The main switch portion may have an operating portion used by the rider for operation. The main switch unit may be located to the rear of, e.g. directly behind or directly backwardly of, the head pipe. In a side view of the vehicle, the main switch unit may be disposed such that at least a part thereof is further forwards than an imaginary line that connects a rear end of an upper edge portion of the head pipe and a rear end of a lower edge portion of the front frame portion. The front cover portion may include a storage portion. The storage portion may be located to at least one side of, e.g. further right and/or further left than the operating portion. The storage portion may have an opening at an upper side thereof.

In the scooter-type vehicle, the vehicle frame may include a head pipe extending forwards and downwards, and a front frame portion extending rearwards and downwards from a rear portion of the head pipe. In a side view of the vehicle, a space may be formed below the head pipe and above the front frame portion. The space formed below the head pipe and above the front frame portion may be effectively and flexibly used. The main switch unit, which may have the main switch portion and may have in a certain degree of size, may be disposed to the rear of the head pipe, and at least a part of the main switch unit may be located further forward than the imaginary line that connects the rear end of the upper edge portion of the head pipe and the rear end of the lower edge portion of the front frame portion. As such, impact on the size of the foot placing space in the front-rear direction due to the disposition of the main switch unit may be reduced.

Further, on the premise of ensuring the size of the foot placing space in the front-rear direction, when the main switch unit is disposed in the rear of the head pipe, and the storage portion is formed to at least one side of right and left of the main switch unit, the storage portion may not be affected by the disposition of the main switch unit, and thereby may sufficiently ensure the size of the storing space.

On the basis of the above, the scooter-type vehicle, may be highly comfortable for a rider, and may ensure the size of foot placing space of the flat-shaped pedal or footboard in a front-rear direction, whilst ensuring the size of storing space for storing and taking articles when the rider is in a riding state.

In the side view of the vehicle, the operating portion may be disposed in a position lower than a seat surface of the saddle portion.

In this way, a scooter-type vehicle that is highly comfortable for a rider may be provided, which, may ensure the size of foot placing space of the pedal or footboard in a front-rear direction, and may also ensure the size of storing space for storing and taking articles when the rider is in a riding state, whilst the knees of the rider may not easily interfere with the main switch unit, especially, the operating portion that can be operated by the rider.

Specifically, when the rider rides the vehicle, knee position may be determined based on a position of the saddle portion. When the rider sits on the saddle portion, the knees of the rider may be located in positions higher than the seat surface of the saddle portion. Therefore, by disposing the main switch unit in a position lower than the seat surface of the saddle portion, when the rider is in the riding state or gets on or off the vehicle, the knees of the rider may not easily interfere with the main switch unit, and the seating position may be highly comfortable.

In the side view of the vehicle, the storage portion may be disposed in a position overlapping the main switch unit in an up-down direction and/or in a front-rear direction, e.g. of the vehicle.

In this way the storage portion may be disposed in a position overlapping the main switch unit in the up-down direction and the front-rear direction, so that the storage portion may effectively make flexible use of space formed, together with the main switch unit, below the head pipe and above the front frame portion, in a side view of the vehicle. Therefore, a vehicle that is highly comfortable for a rider may be provided, which, on the one hand, may ensure the size of foot placing space of the pedal or footboard in a front-rear direction, and on the other hand, may also ensure the size of storing space for storing and taking articles when the rider is in a riding state, and when the rider is in the riding state or gets on or off the vehicle, the knees of the rider may not easily interfere to with a storage portion.

A lower-end portion of the main switch unit may be located further forward with respect to the vehicle than an upper-end portion of the main switch unit.

By disposing a lower-end portion of the main switch unit so as to be located further forward with respect to the vehicle than the upper-end portion of the main switch unit, the main switch unit may be disposed in or on the head pipe so as to incline from the upper rear with respect to the vehicle to the lower front with respect to the vehicle. Therefore, the portion in or of the main switch unit that is located further forward than an imaginary line that connects a rear end of an upper or upmost edge portion of the head pipe and a rear end of a lower or lowermost edge portion of a front frame portion may be enlarged, so that space formed below the head pipe and above the front frame portion may be more effectively and flexibly used. When compared with a scooter-type vehicle having a main switch unit vertically disposed, this may further ensure the size of foot placing space of the pedal or footboard in a front-rear direction.

The scooter-type vehicle may comprise a hook. The hook may be installed in the main switch unit, e.g. to or from the rear of the main switch unit.

The main switch unit may be disposed such that at least a part of the main switch unit is located further forward than the imaginary line that connects the rear end of the upper or uppermost edge portion of the head pipe and the rear end of the lower or lowermost edge portion of the front frame portion. The hook may be installed in the main switch unit. Therefore, in addition to ensuring the size of foot placing space of the pedal or footboard in a front-rear direction, and ensuring, the size of storing space into which hands of a rider can enter when the rider is in the riding state, compared with a case in which a hook is installed, through one side of the main switch unit, in a bracket by using the bracket that is fastened to the head pipe. By directly installing the hook in the main switch unit, a component such as a bracket may be omitted, and installation strength of the hook may also be improved. The main switch unit may further include a locking mechanism that locks rotation of the steering mechanism relative to the head pipe.

A main switch unit may be formed to be large because of having both the main switch portion and the locking mechanism. However, the main switch unit may be disposed in or to the rear of a head pipe, and in a side view of the vehicle at least a part of the main switch unit may be located further forward than the imaginary line that connects the rear end of the upper or uppermost edge portion of the head pipe and the rear end of a lower or lowermost edge portion of the front frame portion. Therefore, even though a large main switch unit as described above may be used, the scooter-type vehicle may be highly comfortable for a rider. The size of foot placing space of a flat-shaped pedal in a front-rear direction may be ensured, and the size of storing space for storing and taking articles when the rider is in a riding state may also be ensured.

The scooter-type vehicle may comprise or be configured to receive a key unit. The key unit may be configured to operate the operating portion of the main switch portion. The operating portion may be a key insertion portion for the key unit to be inserted in.

Since the vehicle has the key insertion portion into which the key unit can be inserted, a main switch portion may be long in a direction of insertion of a key. However, the main switch unit may be disposed in the rear of a head pipe, and in a side view of the vehicle, at least a part of the main switch unit may be located further forward than the imaginary line that connects the rear end of the upper or uppermost edge portion of the head pipe and the rear end of a lower or lowermost edge portion of the front frame portion. Therefore, even though the main switch unit that is long in a direction of insertion of a key may be used, a vehicle that is highly comfortable for the rider may also be provided, which may ensure the size of foot placing space of the pedal or footboard in the front-rear direction, and may also ensure the size of storing space for storing and taking articles when the rider is in a riding state.

The key unit may communicate, e.g. remotely or wirelessly communicate, with the main switch portion. The main switch portion may communicate with the key unit by operating the operating portion.

The main switch portion may communicate with the key unit by operating the operating portion. Therefore, the main switch portion may not be in a size that allows insertion of the key unit, which may easily ensure the size of foot placing space of the pedal or footboard in a front-rear direction. Moreover, as the rider may not ride the vehicle when the key unit is inserted into the main switch unit, reduction of the rider's comfort that may be caused by interference between knees of the rider and the key unit may be prevented. Accordingly, a vehicle that is highly comfortable for a rider may be provided that may ensure foot placing space of the pedal or footboard in a front-rear direction, and may ensure storing space for storing and taking articles when the rider is in a riding state.

In a side view of the vehicle, at least part of the storage portion may overlap the head pipe in the up-down direction.

It will be appreciated that features analogous to those described in relation to any of the above aspects may be individually and separably or in combination applicable to any of the other aspects.

Apparatus features analogous to, or configured to implement, those described above in relation to a method and method features analogous to the use and fabrication of those described above in relation to an apparatus are also intended to fall within the scope of the present invention.

BRIEF DESCRIPTION OF THE DRAWINGS

An embodiment of the present invention will now be described, by way of example only, with reference to the accompanying drawings, in which.

DETAILED DESCRIPTION OF THE INVENTION

A vehicle of the present invention is described below in detail with reference to one embodiment shown in the accompanying drawings.

Figure 1:
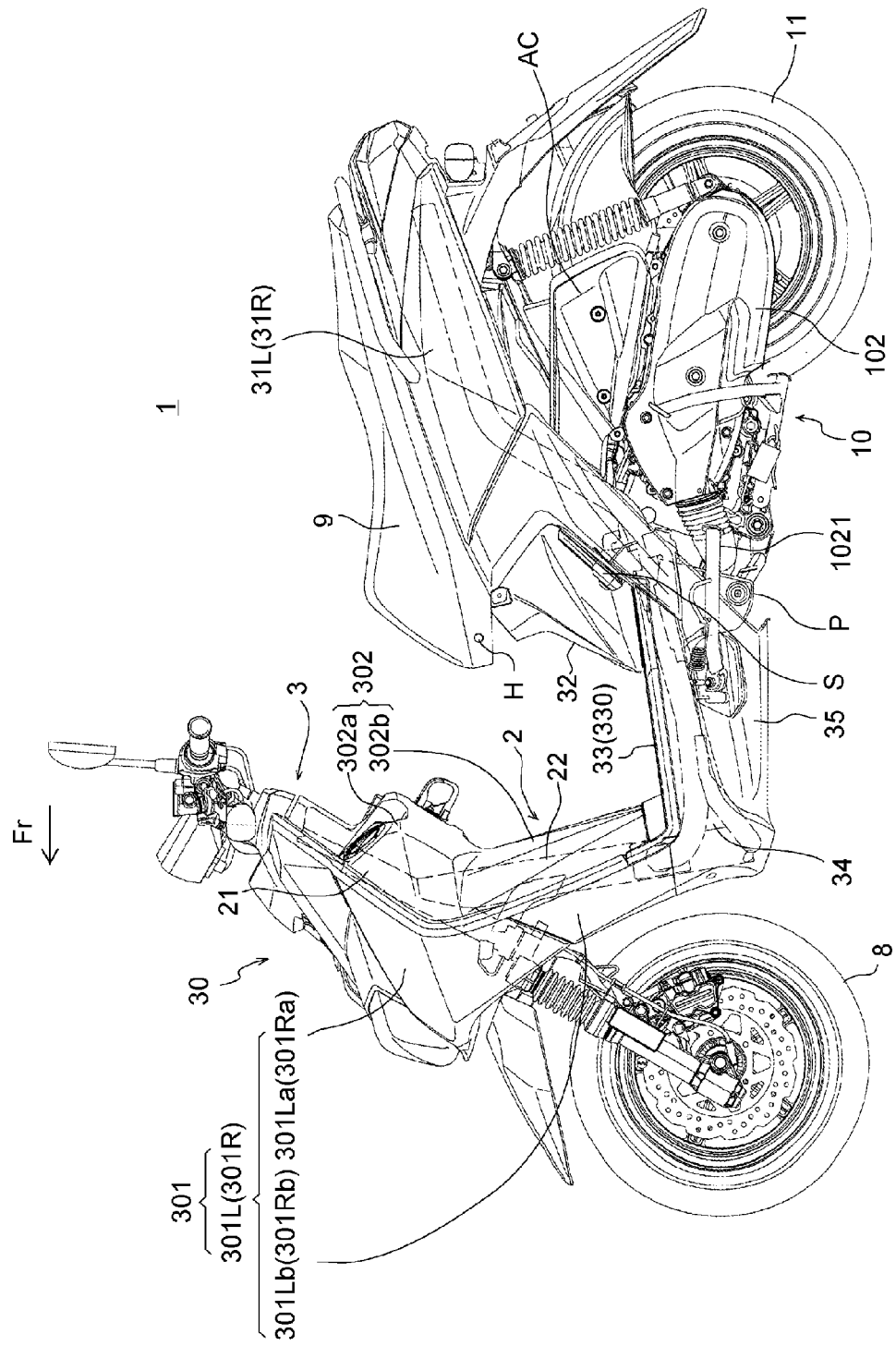
FIG. 1 is a left side view of a scooter-type vehicle according to the present invention.
Figure 2:
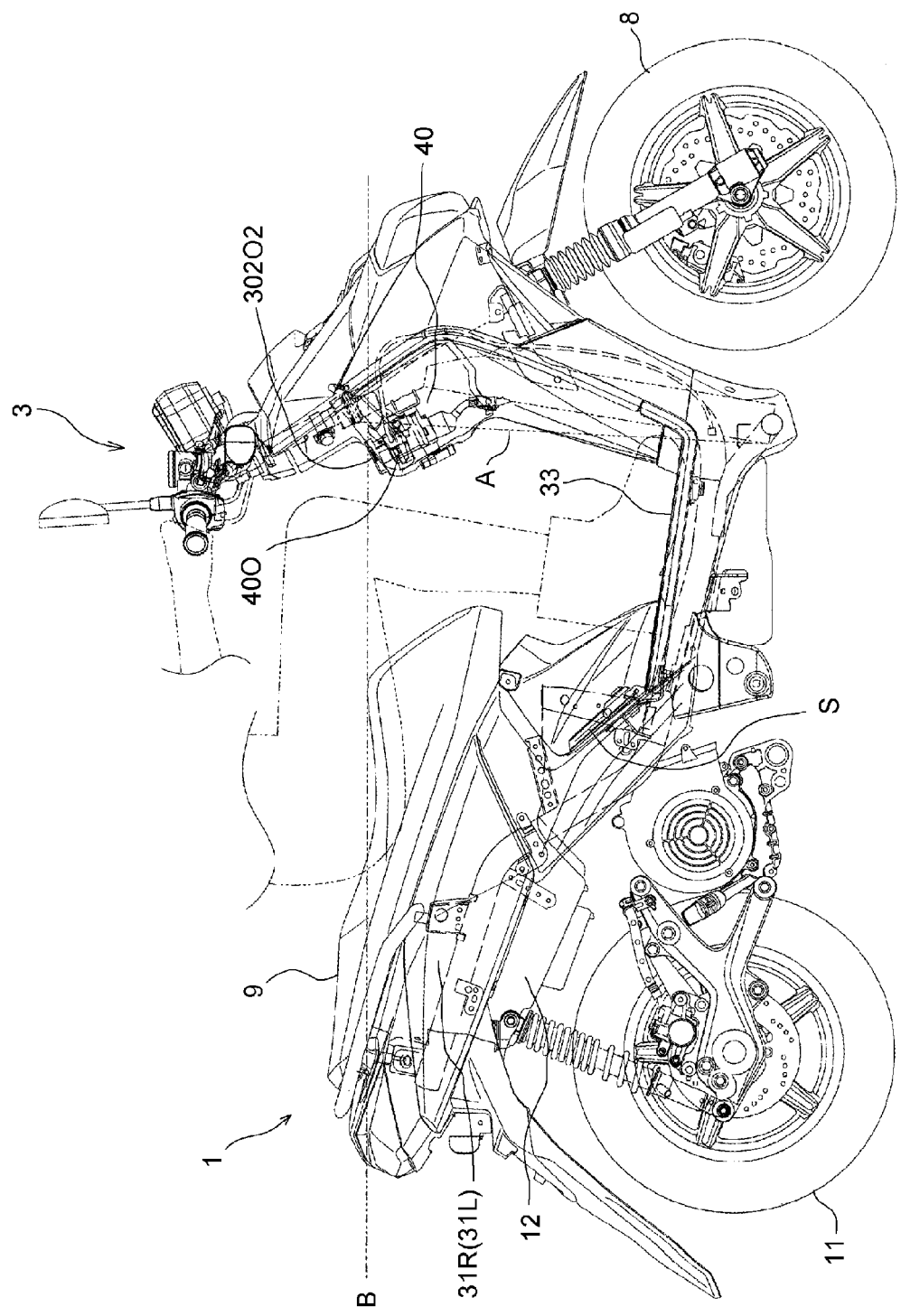
FIG. 2 is a right side view illustrating a state of a rider riding the scooter-type vehicle shown in FIG. 1.
Figure 3:
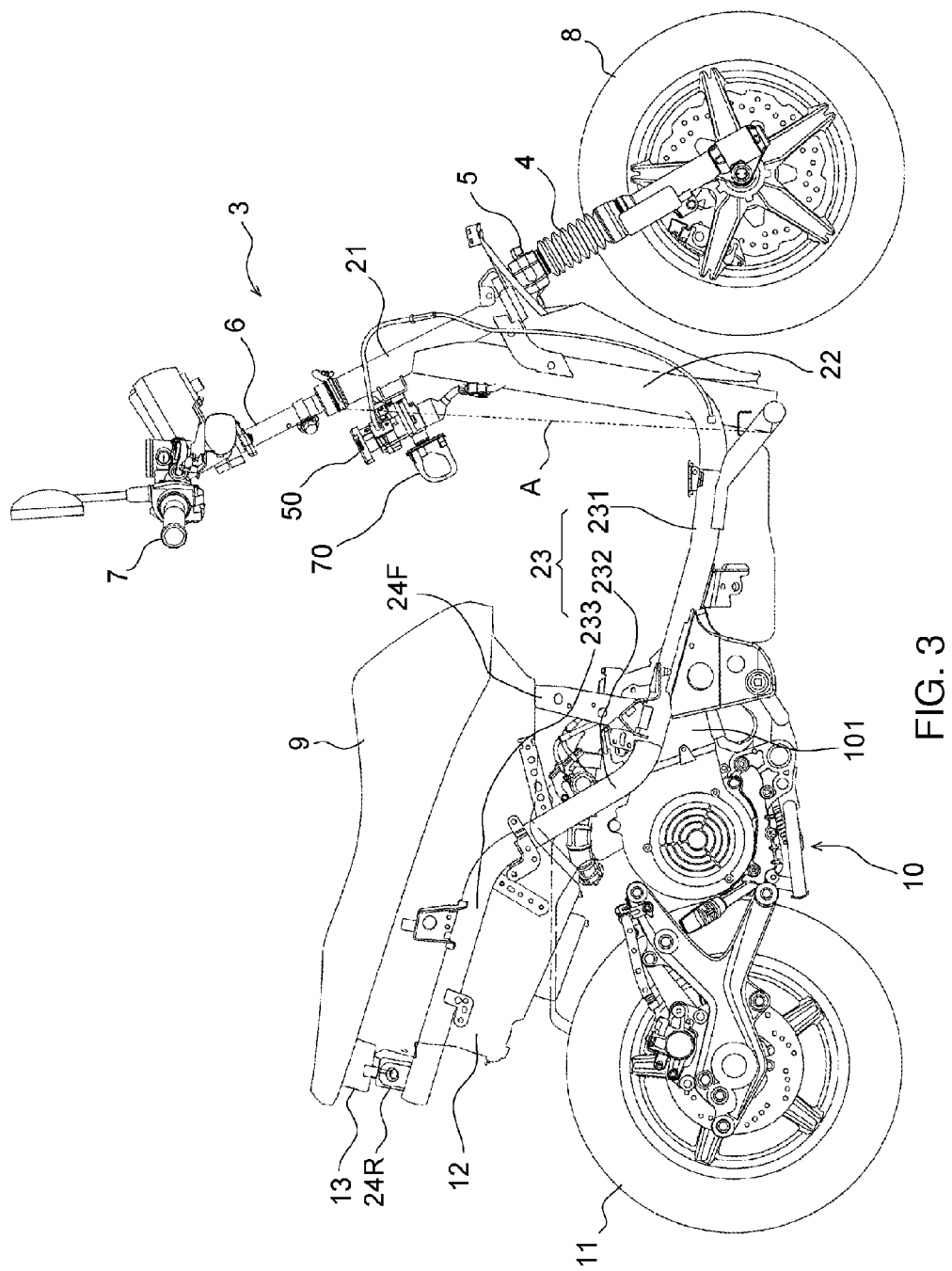
FIG. 3 is a right side view illustrating a state of the scooter-type vehicle after a vehicle cover is removed according to the present invention.
Figure 4:
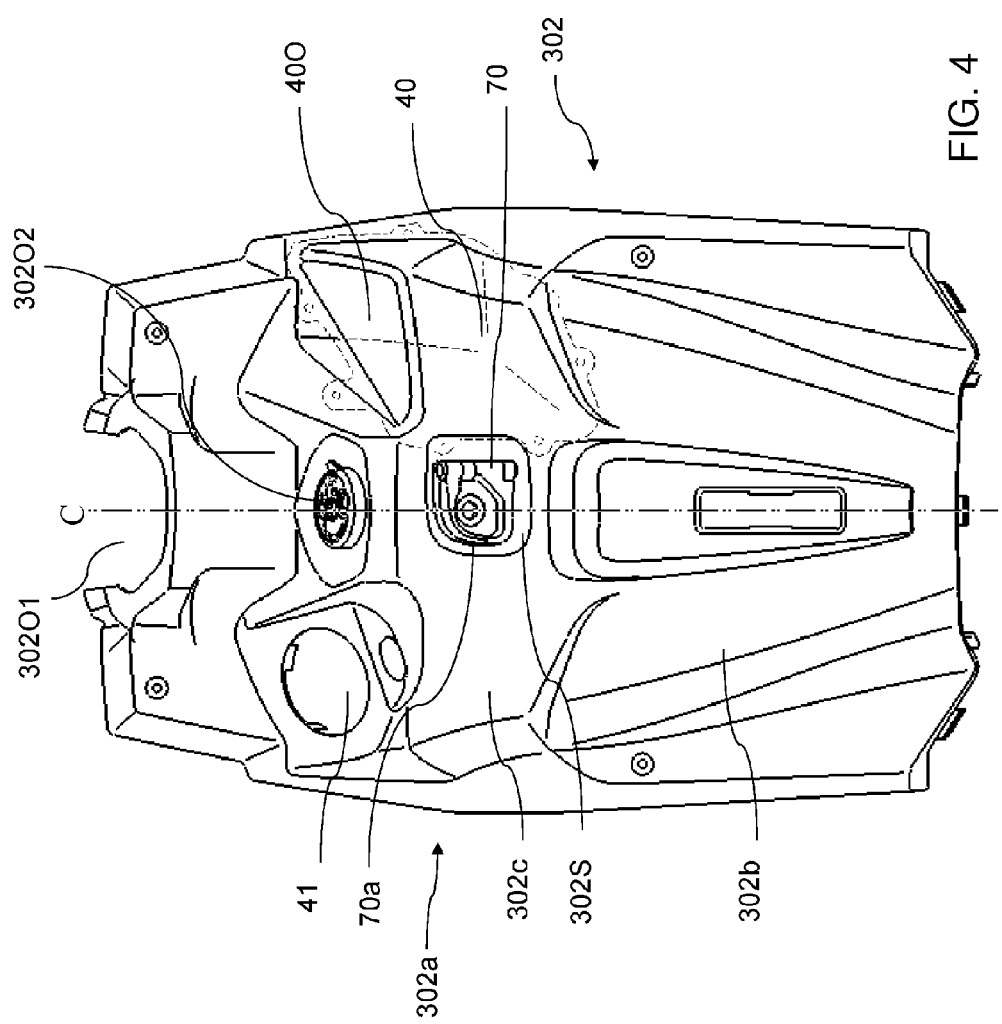
FIG. 4 is a rear view of an appearance of a vehicle front structure of the scooter-type vehicle according to the present invention.
Figure 5:
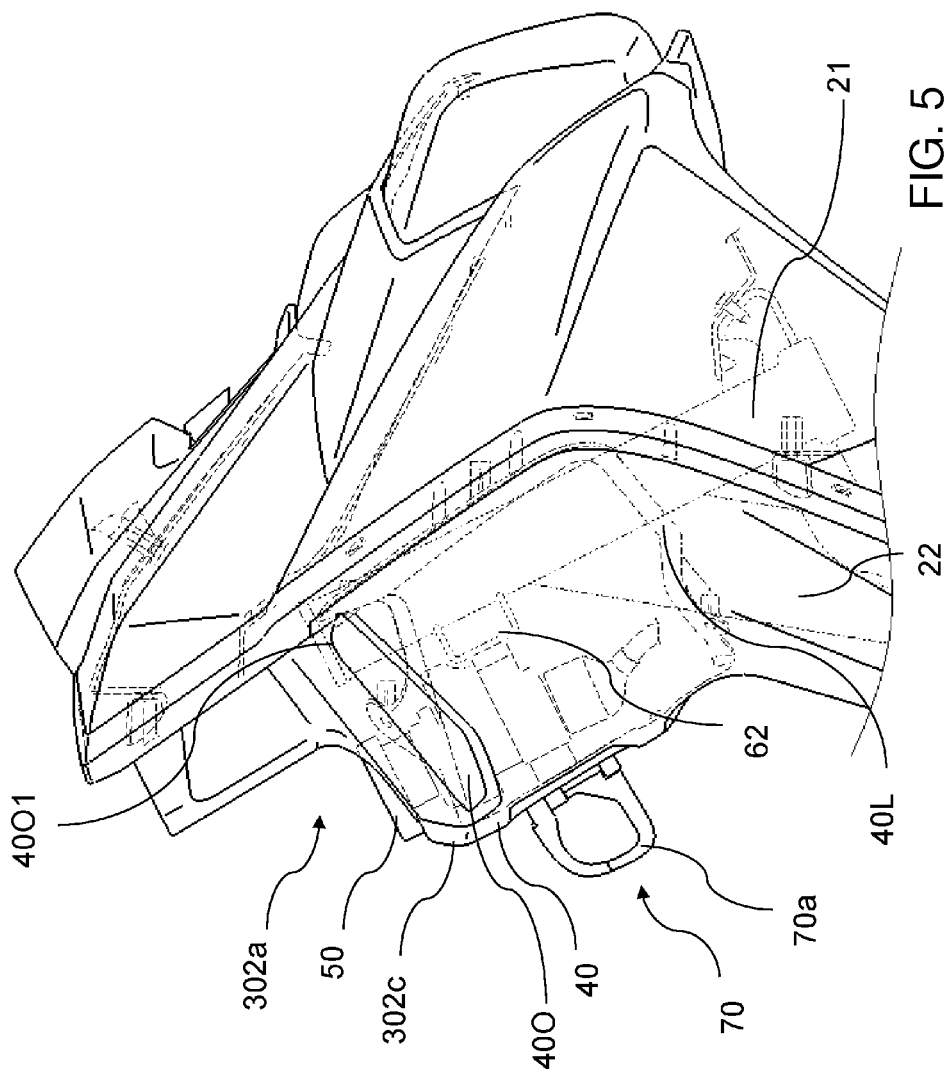
FIG. 5 is an enlarged side view of a part of the vehicle front structure that is viewed from a right side of the scooter-type vehicle according to the present invention.
Figure 6:
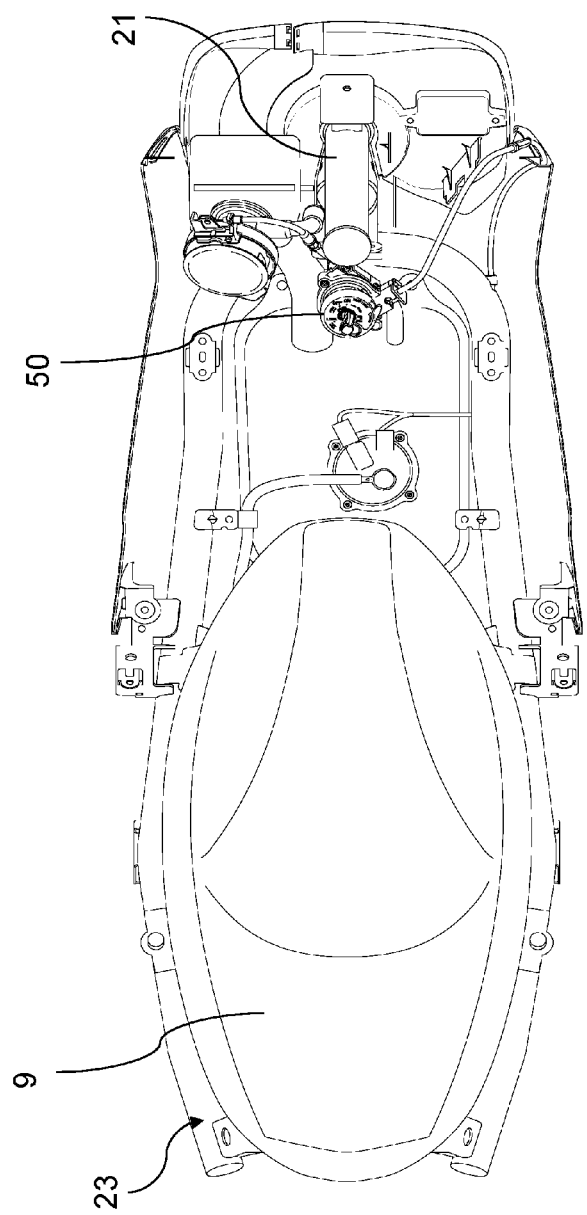
FIG. 6 is a top view of a part of the scooter-type vehicle in a state after a vehicle cover is removed according to the present invention.
Figure 7:
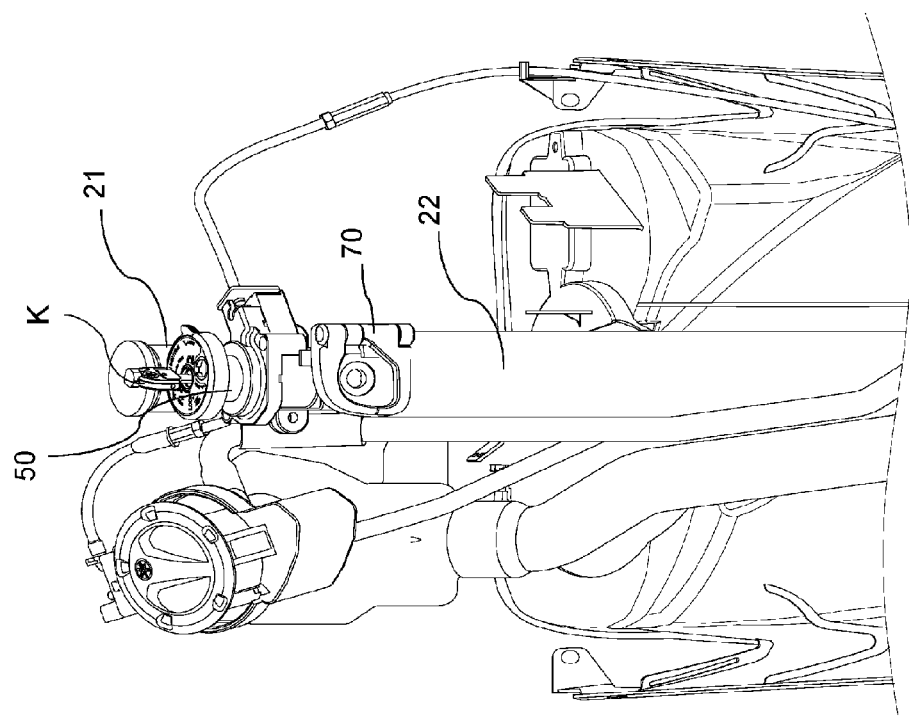
FIG. 7 is a rear view of a part of a vehicle front part of the scooter-type vehicle in a state after a vehicle cover is removed according to the present invention.
Figures 8A, 8B:
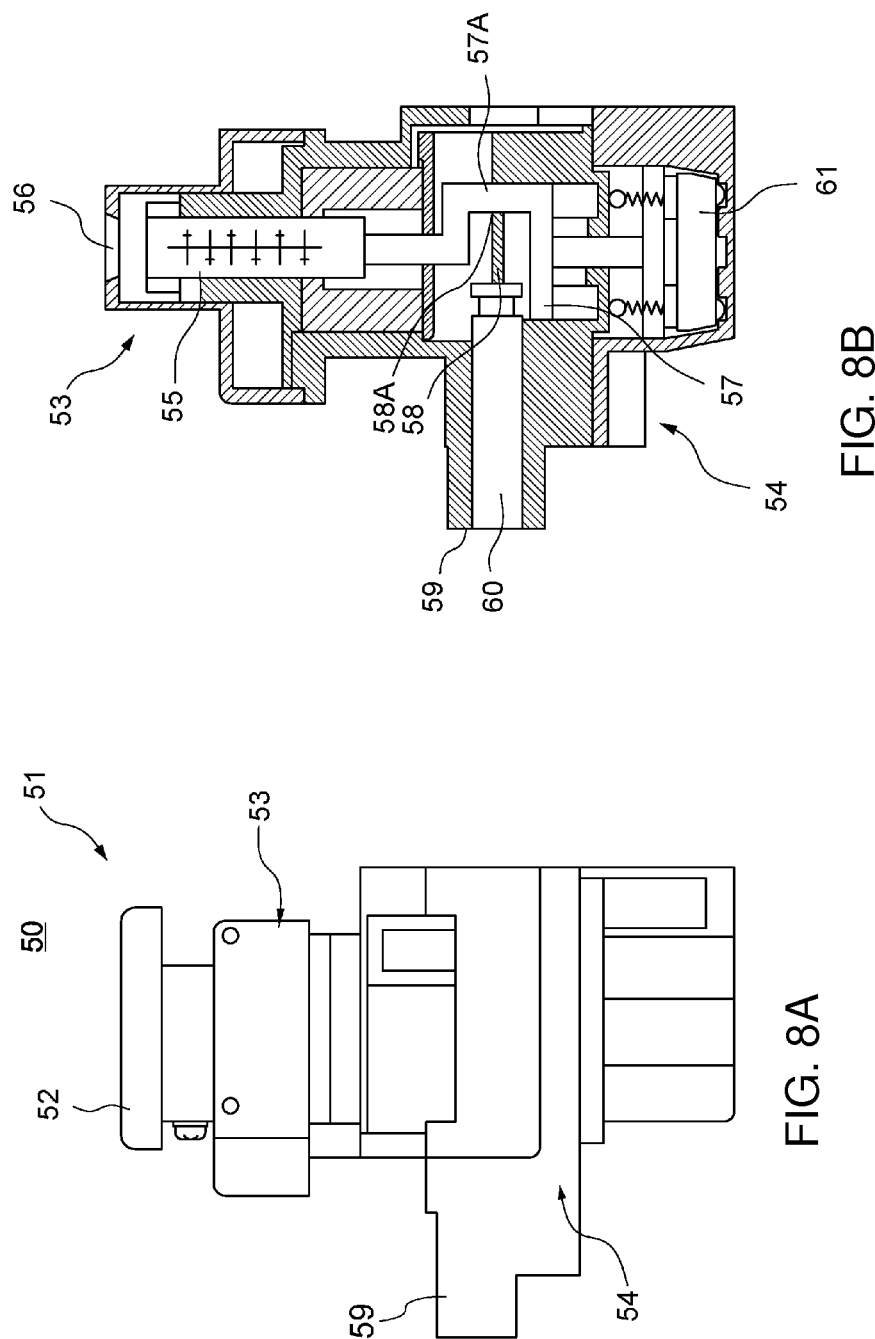
FIG. 8A is a side view of an appearance of a single product of a main switch unit of the scooter-type vehicle according to the present invention.
FIG. 8B is a sectional view of an inner structure of a main switch unit shown in FIG. 8A.

FIG. 1 is a left side view of a scooter-type vehicle, specifically a scooter-type vehicle 1, according to the present invention, where dashed lines are used to indicate a vehicle frame 2 covered by a vehicle cover. FIG. 2 is a right side view illustrating a state of a rider riding the scooter-type vehicle 1 shown in FIG. 1. FIG. 3 is a right side view illustrating a state of the scooter-type vehicle 1 after a vehicle cover is removed according to the present invention. FIG. 4 is a rear view of an appearance of a vehicle front structure of the scooter-type vehicle 1 according to the present invention, where dashed lines are used to indicate an inner structure of a storage portion 40. FIG. 5 is an enlarged side view of a part of the vehicle front structure that is viewed from a right side of the scooter-type vehicle 1 according to the present invention, where dashed lines are used to indicate components, such as a head pipe 21 and a main switch unit 50, that are covered by a vehicle cover. FIG. 6 is a top view of a part of the scooter-type vehicle 1 in a state after a vehicle cover is removed according to the present invention. FIG. 7 is a rear view of a part of a vehicle front part of the scooter-type vehicle 1 in a state after a vehicle cover is removed according to the present invention. FIG. 8A is a side view of an appearance of a single product of a main switch unit 50 of the scooter-type vehicle according to the present invention. FIG. 8B is a sectional view of an inner structure of the main switch unit 50 shown in FIG. 8A.

In the following description, front, rear, left, and right directions respectively indicate front, rear, left, and right directions viewed by the rider riding the scooter-type vehicle 1. Furthermore, a symbol Fr in FIG. 1 indicates front.

The Whole Vehicle

The scooter-type vehicle 1 is a so-called "underbone type" scooter-type vehicle. As shown in FIGS. 1 and 3, a front-end portion of a vehicle frame 2 of the underbone type vehicle supports a steering mechanism 3 configured to operate a direction of a front wheel 8, and in a central portion of the vehicle frame 2, supports a unit-swing-type power unit 10 that can swing up and down by using a pivot portion P as a center. A saddle portion 9 is installed above the power unit 10. The saddle portion 9 may open or close relative to a storage box 12 by using a hinge pin H of a front-end portion of the saddle portion 9 as a center.

As shown in FIG. 2, a rider operates the steering mechanism 3 to ride the scooter-type vehicle 1 while sitting on the saddle portion 9 and placing feet on an upper surface of a pedal or footboard 33. Moreover, FIG. 2 only shows the rider, but the scooter-type vehicle 1 of this implementation form is a vehicle for two persons to ride, and a co-rider may ride the vehicle while sitting on the rear of the saddle portion 9 and placing feet on a foot placing portion S.

As shown in FIG. 3, the steering mechanism 3 includes a pair of front suspensions 4, a steering bracket 5, a steering shaft 6, and a handle 7. The pair of front suspensions 4 extends forwards and downwards, and the front wheel 8 is disposed at a lower end thereof. A front or top end of the front suspension 4 is installed in the steering bracket 5 fixedly fastened to a lower-end portion of the steering shaft 6. The handle 7 used for operation by the rider is disposed in an upper end of the steering shaft 6.

As shown in FIG. 1 and FIG. 3, the power unit 10 is a V-shaped belt-type continuously variable transmission that has an engine 101 and is disposed in a transmission case 102 extending from one side of the engine 101 towards the rear of the vehicle, and the engine 101 and the transmission case 102 are integrally formed. The engine 101 carries a cylinder axis substantially horizontally forwards. A front-end portion of the transmission case 102 is connected to an air duct 1021 sucking external gas, the external gas being used to dissipate heat produced by belt friction of the V-shaped belt-type continuously variable transmission and the like. A rear wheel 11 driven by driving power of the engine 101 is freely rotatably supported in a rear-end portion of the transmission case 102. An air cleaner AC filtering external gas provided for the engine 101 is disposed above the transmission case 102. Moreover, the engine 101 and the transmission case 102 may also be separately instead of integrally formed.

Vehicle Frame

As shown in FIG. 3, a vehicle frame 2 includes: a head pipe 21, into which a steering shaft 6 may be inserted, rotatably supporting a steering shaft 6, and extending obliquely downwards towards the front of the vehicle; a front frame portion 22, being connected to the head pipe 21 by means of, for example, welding, extending obliquely downwards towards the rear of the vehicle, and being located to the rear of a front wheel 8; and a rear frame portion 23, being welded to a lower portion of the front frame portion 22, extending rearwards, and supporting a saddle portion 9 from the bottom.

The front frame portion 22 includes one pipe member, and in a front view, overlaps the front wheel 8 when a steering mechanism 3 does not rotate (that is, the front wheel 8 does not deflect relative to the center line extending in the front and back direction centrally in the left and right direction of the vehicle).

The rear frame portion 23 includes: a pair of left and right lower rear frame portions 231, which are welded to a lower portion of the front frame portion 22, and extend rearwards at a gentle gradient; a pair of left and right middle rear frame portions 232, which extend rearwards and upwards at a steep gradient respectively from the rear portions of the pair of the left and right lower rear frame portions 231; and a pair of left and right upper rear frame portions 233, which extend rearwards and upwards at a gentle gradient respectively from the rear portions of the pair of the left and right middle rear frame portions 232, and support the saddle portion 9 from the bottom.

In addition, the rear end portions of the pair of the left and right lower rear frame portions 231 and those of the pair of the left and right upper rear frame portions 233 are separately connected by using cross frames 24F and 24R that have openings downwards and are substantially U-shaped in a front view. The saddle portion 9 and a storage box 12 are supported by using the cross frames 24F and 24R and the pair of the left and the right upper rear frame portions 233. In addition, as shown in FIG. 1 and FIG. 3, when the saddle portion 9 is closed relative to the storage box 12 using a hinge pin H as a center, the saddle portion 9 is locked by engaging a saddle portion closing mechanism 13 disposed in the saddle portion 9 and a locking portion disposed in the cross frame 24R.

Preferably, the lower rear frame portions 231, the middle rear frame portions 232, and the upper rear frame portions 233 are successive pipe members and are disposed in pairs in left and right. However, some or all thereof may also include one or more pipe members. Further, the lower rear frame portion 231 may be welded to a lower-end portion of the front frame portion 22, or may be welded to "a part except the lower or lowest-end portion" of the lower portion of the front frame portion 22.

In addition, as shown in FIG. 3, in a side view, the head pipe 21 extends obliquely downwards towards the front of the vehicle, and the front frame portion 22 extends obliquely downwards towards the rear of the vehicle, boomerang-shaped space is formed to the rear of the head pipe 21 and close to a junction portion of the head pipe 21 and the front frame portion 22.

In more detail, in the side view, the junction portion of the head pipe 21 and the front frame portion 22 is located further forward than an imaginary line A that connects a rear end of an upper or uppermost edge portion of the head pipe 21 and a rear end of a lower or lowermost edge portion of the front frame portion 22. That is, in the side view, the junction portion of the head pipe 21 and the front frame portion 22 is located at a front end of the space formed in the rear of the head pipe 21 and the front frame portion 22. In this way, in the side view, the space divided by the head pipe 21, the front frame portion 22, and the imaginary line A that connects the rear end of the upper or uppermost edge portion of the head pipe 21 and the rear end of the lower or lowermost edge portion of the front frame portion 22 is space that is large in a front-rear direction and is close to the junction portion of the head pipe 21 and the front frame portion 22.

The scooter-type vehicle of the present invention focuses on disposing components such as a main switch unit 50 and a storage portion 40 by effectively and flexibly using the boomerang-shaped space formed close to the junction portion of the head pipe 21 and the front frame portion 22.

Vehicle Cover

As shown in FIG. 1, a front cover portion 30 is disposed around the steering mechanism 3, the head pipe 21, and the front frame portion 22. As shown in FIG. 1 and FIG. 2, side cover portions 31L and 31R are disposed below, e.g. underneath, the saddle portion 9 and at the side of the storage box 12. A flat-shaped pedal or footboard 33 lower than a bottom plate is disposed between the front cover portion 30 and the side cover portions 31L and 31R, for the rider to place feet on. In addition, a central cover portion 32 is disposed between a rear-end portion of the flat-shaped pedal or footboard 33 and the bottom of a front portion of the saddle portion 9.

The front cover portion 30 includes a side front cover portion 301 located at the side of the head pipe 21 and a rear front cover portion 302, where the rear front cover portion 302 is located to the rear of the head pipe 21, and is connected to the side front cover portion 301 from the rear of the side front cover portion 301.

The rear front cover portion 302 has an upper rear front cover portion 302a and a lower rear front cover portion 302b. The upper rear front cover portion 302a is disposed so as to extend upwards in a direction obliquely from the front to the rear, and covers the head pipe 21 from the rear of the head pipe 21. The lower rear front cover portion 302b is disposed so as to extend in a direction obliquely rearwards and downwards from a lower edge of the upper rear front cover portion 302a, and covers the front frame portion 22 from the rear of the front frame portion 22. The side front cover portion 301 includes a left side front cover portion 301L located at the left side of the head pipe 21, and a right side front cover portion 301R located at the right side of the head pipe 21.

The left side front cover portion 301L includes an upper left side front cover portion 301La, and a lower left side front cover portion 301Lb that is separately disposed with the upper left side front cover portion 301La. The right side front cover portion 301R includes an upper right side front cover portion 301Ra, and a lower right side front cover portion 301Rb that is separately disposed with the upper right side front cover portion 301Ra. The lower left side front cover portion 301Lb and the lower right side front cover portion 301Rb may not be separately disposed. In a side view of the vehicle, the upper left side front cover portion 301La and the upper right side front cover portion 301Ra are in a shape concavely curved towards the front of the vehicle, that is, in the side view of the vehicle, the upper left side front cover portion 301La and the upper right side front cover portion 301Ra are in a boomerang shape.

As shown in FIG. 4, in a central portion of the rear front cover portion 302 in a left-right direction, an opening portion 302O1 into which the steering mechanism 3 is inserted is disposed at an upper end of the upper rear front cover portion 302a. In addition, as shown in FIG. 5, the upper rear front cover portion 302a of the rear front cover portion 302 further includes an upper protruding cover portion 302c that protrudes towards the rear of the vehicle. A following main switch 50 is covered by the rear front cover portion 302, disposed inside the rear front cover portion 302, and exposed from an opening 302O2 provided at the upper protruding cover portion 302c of the rear front cover portion 302.

In addition, as shown in FIG. 1, the flat-shaped pedal or footboard 33 is substantially and horizontally curved slightly downwards from a connecting portion of the rear front cover portion 302 and extends rearwards, and is connected to a lower end of the central cover portion 32. At the left side and the right side of the flat-shaped pedal or footboard 33, a pair of flat-shaped pedal or footboard side cover portions 34 are formed so as to extend downwards from two edges from the left side and the right side of the flat-shaped pedal or footboard 33. Below the flat-shaped pedal or footboard 33, a bottom cover portion 35 that is in a U shape in a cross section in a left-right direction of the vehicle is formed between the pair of flat-shaped pedal or footboard side cover portions 34. In addition, below the flat-shaped pedal or footboard 33, a fuel tank (not shown in the figure) is disposed between a pair of left and right lower rear frame portions 231.

The flat-shaped pedal or footboard 33 has a foot placing surface 330 that bears the feet of the rider. In this implementation form, the flat-shaped pedal or footboard 33 has a same height in the left and right directions, and the foot placing surface 330 is substantially smoothly formed entirely, but is not limited thereto. The foot placing surface 330 may also have a concave-convex portion, where there is no discomfort when feet are placed on the concave-convex portion. Since there is no discomfort when feet are placed on the concave-convex portion, no discomfort is caused by the concave-convex portion produced by disposing a vehicle frame in a center in a vehicle-width direction below the flat-shaped pedal or footboard 33. That is, the foot placing surface 330 may also be disposed as having a convex portion slightly and partially protruding upwards according to a shape of a component such as a fuel tank disposed below the flat-shaped pedal or footboard 33.

The vehicle covers described above, such as the front cover portion 30, the side cover portions 31L and 31R, the flat-shaped pedal or footboard 33, and the central cover portion 32 are appearance components, which may be formed separately and properly by using materials such as plastics. Each cover component is a product integrally formed by means of injection forming, but may also include a plurality of components. For example, in the front cover portion 30 of this implementation form, the rear front cover portion 302 is formed by integrating the upper rear front cover portion 302a and the lower rear front cover portion 302b. The upper left side front cover portion 301La and the upper right side front cover portion 301Ra in the side front cover portion 301 are integrated and connected by using a central cover portion not shown in the figure, but may also be separately disposed. In addition, they may also separately include a plurality of components. Furthermore, in terms of the appearance and manufacturing of the vehicle cover, an integral and bilaterally symmetrical structure is preferred.

Main Switch Unit

In the following, a structure of a main switch unit 50 is described. The main switch unit 50 has a main switch portion 51, the main switch portion having an operating portion used by a rider for operation.

In this implementation form, the main switch portion 51 includes an exposed portion 52 and a key insertion portion 53. The operating portion is the key insertion portion 53 into which a key unit K can be inserted, as shown in FIG. 7. In more detail, as shown in FIG. 8A, the main switch unit 50 includes: the exposed portion 52, including a shutter, a display portion displaying an operation of the main switch unit, and the like; and the key insertion portion 53, into which the rider can insert the key unit K. The rider may operate the key insertion portion 53 (the operating portion) of the main switch portion 51 by inserting the key unit K.

Moreover, the main switch unit 50 further includes a locking mechanism 54, which locks rotation, relative to a head pipe 21, of a steering mechanism 3.

As shown in FIG. 8B, a rotor 55 substantially in a cylinder shape is rotatably disposed in the key insertion portion 53. A key insertion hole 56 for insertion of a key is formed in the rotor 55 from an upper surface thereof along a central axis, and an upper-end portion of a crank 57 of the locking mechanism 54 is engaged to a lower end of the rotor 55.

The locking mechanism 54 includes: a locking rod linking member 58, having a through portion 58A through which a middle portion 57A between two arms of the crank 57 is inserted, so that the locking rod linking member 58 can reciprocate along with rotation of the crank 57; and a locking rod 60, which can move forward or withdraw relative to a corner hole 59. One end of the locking rod 60 abuts the locking rod linking member 58, and the locking rod 60 locks the steering mechanism 3 by means of protruding outwards from the corner hole 59 and by means of rotation of the crank 57 and reciprocating of the locking rod linking member 58 that are caused by rotation of the rotor 55. In addition, a contact panel 61 is engaged to a lower end of the crank 57, and the contact panel 61 is rotated by using rotation of the crank 57, in which way a specified contact is open or closed.

As shown in FIGS. 3, 5, 6, and 7, the main switch unit 50 is to the rear of, e.g. directly behind, the head pipe 21. As shown in FIG. 6, in a top view, the main switch unit 50 is in line with the head pipe 21 in a front-rear direction. As shown in FIG. 7, in a rear view, the main switch unit 50 is disposed in a position overlapping the head pipe 21 in a left-right direction. As shown in FIGS. 3 and 5, the main switch unit 50 is installed in the head pipe 21 from the rear of the head pipe 21 through a bracket 62. In addition, in the side view of the vehicle, at least a part of the main switch unit 50 is located further forward than the imaginary line A that connects the rear end of the upper or uppermost edge portion of the head pipe 21 and the rear end of the lower or lowermost edge portion of a front frame portion 22. That is, the main switch unit 50 is disposed below, e.g. directly underneath, at least the top of the head pipe 21 and above, e.g. directly overhead of, at least the bottom of the front frame portion 22, in boomerang-shaped space close to, e.g. directly behind, a junction portion of the head pipe 21 and the front frame portion 22.

As described above, the main switch unit 50 includes the exposed portion 52, the key insertion portion 53 (the operating portion), and the locking mechanism 54, and therefore, the main switch unit 50 has a certain degree of size. In this implementation form, the main switch unit 50 is disposed by flexibly using the boomerang-shaped space close to, e.g. directly behind, the junction portion of the head pipe 21 and the front frame portion 22, which can reduce impact on the size of foot placing space above a flat-shaped pedal or footboard 33 in a front-rear direction caused by the disposition of the main switch unit 50. Therefore, the size of the foot placing space in the front-rear direction can be ensured.

In addition, the main switch unit 50 may be vertically installed in or on the head pipe 21. However, more preferably, as shown in FIGS. 3 and 5, the main switch unit 50 is installed in or on the head pipe 21 in a manner that, in a side view, a lower-end portion of the main switch unit 50 is located further forward with respect to the vehicle than an upper-end portion. Optimally, the main switch unit 50 is installed in or on the head pipe 21 in a manner that, in a side view, a central axis of the main switch unit 50 is in parallel with a central axis of the head pipe 21.

In this way, the main switch unit 50 is disposed based on an extending direction of the head pipe 21 and in a manner in which the main switch unit 50 inclines forwards and downwards from the rear top with respect to the vehicle, which therefore can further ensure the boomerang-shaped space formed close to the junction portion of the head pipe 21 and the front frame portion 22 in which to dispose the main switch unit 50. Therefore, volume distribution, in the main switch unit 50, further forward than the imaginary line A that connects the rear end of the upper or uppermost edge portion of the head pipe 21 and the rear end of the lower or lowermost edge portion of the front frame portion 22 may be improved, so as to further reduce impact of the disposition of the main switch unit 50 on the size of the foot placing space above the flat-shaped pedal or footboard 33 in the front-rear direction.

In addition, as shown in FIG. 4 and FIG. 5, below an opening portion 302O1 of a rear front cover portion 302, an opening portion 302O2 that is configured to expose the key insertion hole 56 of the key insertion portion 53 of the main switch unit 50 is disposed on an upper surface of an upper protruding cover portion 302c. To expose the key insertion hole 56, it only needs to let the key insertion hole 56 not be covered by the upper protruding cover portion 302c, viewed in an axis direction of the head pipe 21, as a shutter of the exposed portion 52 is open. In the side view, the key insertion portion 53 may be disposed in a position higher than the upper surface of the upper protruding cover portion 302c, or may be disposed at a same height as the upper surface of the upper protruding cover portion 302c, or may be disposed in a position lower than the upper surface of the upper protruding cover portion 302c.

In addition, as shown in FIG. 2, in the side view of the vehicle, the opening portion 302O2 is disposed in a potion lower than a seat surface (referring to an imaginary line B in FIG. 2) of a saddle portion 9. In this way, the main switch unit 50 (especially the operating portion used by the rider for operation) may be disposed in a position lower than the seat surface of the saddle portion 9 in the side view of the vehicle. As shown in FIG. 2, when the rider sits on the saddle portion 9, knees of the rider are in positions higher than the seat surface of the saddle portion 9. In this implementation, the opening portion 302O2 exposed from the key insertion hole 56 of the key insertion portion 53 of the main switch unit 50 is disposed in a position lower than the seat surface of the saddle portion 9. In this way, it can be ensured that the main switch unit 50 is disposed in a position lower than the seat surface of the saddle portion 9, and when the rider rides the vehicle, or gets on or off the vehicle, the knees of the rider do not easily interfere with the main switch unit 50, thereby ensuring comfortableness.

Storage Portion

As shown in FIG. 4, in this embodiment, to the right of a center line C of a rear front cover portion 302, a storage portion 40 that can receive a bottle or the like and the rear front cover portion 302 are integrally disposed. The storage portion 40 has an opening portion 40O with an opening facing upwards, and the opening portion 40O is located further right than an opening portion 302O2. That is, the opening portion 40O is located further right than an operating portion used by a rider for operation.

Furthermore, the disposition of the storage portion 40 is not limited to the foregoing description, and the storage portion 40 may also be disposed to the left of the center line C of the rear front cover portion 302, or disposed to both the left and the right of the center line C of the rear front cover portion 302. In addition, in a case in which the storage portion 40 is disposed at only one side of the left and the right of the center line C of the rear front cover portion 302, preferably, a fuel feeding port 41 is disposed at the other side of the left and the right of the center line C. For example, as shown in FIG. 4 in this embodiment, the fuel feeding port 41 is disposed to the left of the center line C of the rear front cover portion 302.

In addition, as shown in FIG. 5, in a side view the storage portion 40 is disposed in a manner of overlapping at least a part of a main switch unit 50 in a front-rear direction. More preferably, the storage portion 40 is disposed in a manner of overlapping at least a part of a main switch unit 50 and at least a part of a head pipe 21 in a front-rear direction. In this way, in a left-right direction of the vehicle, the storage portion 40 may be disposed by effectively and flexibly using space of at least one of the head pipe 21 disposed in a center and the left and right sides of the main switch unit 50. Therefore, a degree of freedom for disposing the storage portion 40 may be improved in the front-rear direction. As such, even though the storage portion 40 is disposed in the rear front cover portion 302 to improve convenience of storing and taking articles in the storing space when the rider is in a riding state, impact on the size of foot placing space above a flat-shaped pedal or footboard 33 in the front-rear direction can also be reduced.

In addition, as shown in FIG. 5, in a side view the storage portion 40 is disposed in a manner of overlapping at least a part of the main switch unit 50 in an up-down direction. More preferably, as shown in FIG. 5, the storage portion 40 is disposed in a manner of overlapping at least a part of the main switch unit 50 and at least a part of the head pipe 21 in the up-down direction. Optimally, the opening portion 40O of the storage portion 40 is disposed in a position substantially at a same height as an upper-end portion of the main switch unit 50, or in a position lower than an upper-end portion of the main switch unit 50. In this way, as shown in FIG. 2, it can be ensured that the opening portion 40O of the storage portion 40 is disposed in a portion lower than a seat surface of a saddle portion 9, so that when the rider is in a riding state, or gets on or off the vehicle, knees of the rider do not easily interfere to the storage portion 40, thereby ensuring comfortableness.

In addition, in a case in which the storage portion 40 is disposed in the manner of overlapping at least a part of the main switch unit 50 and at least a part of the head pipe 21 in the up-down direction, more preferably, as shown in FIG. 5 an upper end 40O1 of the opening portion 40O of the storage portion 40 is formed to be at a height substantially the same as an upper-end portion of the head pipe 21, and a lower edge portion 40L of the storage portion 40 is formed to be at a height substantially the same as a junction portion of the head pipe 21 and a front frame portion 22. As described above, the upper left side front cover portion 301La and the upper right side front cover portion 301Ra are in a boomerang shape in a side view of the vehicle. Therefore, similar to the rear of the head pipe 21 and the front frame portion 22, the rear of the upper left side front cover portion 301La and the upper right side front cover portion 301Ra have space whose front end is boomerang-shaped in the side view. In more detail, in the side view, the upper left side front cover portion 301La and the upper right side front cover portion 301Ra make central parts of respective rear edge portions in an up-down direction be located further forward than an upper or uppermost end portion of the rear edge portion and a lower or lowermost end portion of the rear edge portion. That is, in the side view, the upper or uppermost left side front cover portion 301La and the upper or uppermost right side front cover portion 301Ra make the central parts of the respective rear edge portions in the up-down direction be located at front ends of the rear edge portions of the upper or uppermost left side front cover portion 301La and the upper or uppermost right side front cover portion 301Ra. Therefore, in this embodiment, in the side view the storage portion 40 is disposed to the rear, e.g. directly behind, of the upper left side front cover portion 301La and the upper right side front cover portion 301Ra and in the boomerang-shaped space formed on at least one of the left and right directions of the head pipe 21, so that storing space of the storage portion 40 can be formed to be large.

Hook

As shown in FIG. 3 and FIG. 5, in a side view, a hook 70 for hanging articles is installed in the rear of a main switch unit 50. The hook 70 has an annular article hanging portion 70a. In addition, as shown in FIG. 5, the hook 70 is installed in the main switch unit 50 with a part inserting through a rear front cover portion 302. As shown in FIG. 4, a hook storage portion 302S for storing the article hanging portion 70a of the hook 70 is disposed below an opening portion 302O2 of the rear front cover portion 302, and the article hanging portion 70a may rotate at a degree of about 90 between a usage position exemplified in FIG. 5 and indicating a part of a right side surface of the vehicle and a storing position exemplified in FIG. 4.

Effects of the Implementation Form

As described above, the scooter-type vehicle 1 of this embodiment includes: a front wheel 8; a steering mechanism 3, including a handle 7 for a rider to operate, and supporting a front wheel 8; a vehicle frame 2, including a head pipe, a front frame portion, and a rear frame portion, the head pipe rotatably supporting the steering mechanism 3 and extending forwards and downwards of the vehicle, the front frame portion 22 extending rearwards and downwards of the vehicle from a rear portion of the head pipe 21, and, in a front view, being disposed so as to overlap the front wheel 8 when the steering mechanism 3 is in a non-rotating state, and the rear frame portion 23 extending rearwards from a lower portion of the front frame portion 22; a saddle portion 9, being supported by the rear frame portion 23; a vehicle cover, including a flat-shaped pedal or footboard 33 and a front cover portion 30, the flat-shaped pedal or footboard 33 being located further forward than the saddle portion 9 and above the rear frame portion 23, and being used by the rider sitting on the saddle portion 9 to place feet on, and the front cover portion 30 extending upwards from a front end of the flat-shaped pedal or footboard 33, and being located in the rear of the head pipe 21 and the front frame portion 22; and a main switch unit 50, having a main switch portion 51, the main switch portion 51 having an operating portion (a key insertion portion 53) used by the rider for operation. The main switch unit 50 is located to, on or in the rear of the head pipe 21, and in a side view of the vehicle, is disposed in a manner that at least a part thereof is further forward than an imaginary line A that connects a rear end of an upper or uppermost edge portion of the head pipe 21 and a rear end of a lower or lowermost edge portion of the front frame portion 22, and the front cover portion 30 includes a storage portion 40 that is located in or to at least one side of further right and left than the operating portion (the key insertion portion 53) and has an opening at an upper side.

According to this implementation form, in the scooter-type vehicle 1, the vehicle frame 2 includes the head pipe 21 extending forwards and downwards and the front frame portion 22 extending rearwards and downwards from the rear of the head pipe 21, and therefore, in the side view of the vehicle, the space formed below, e.g. directly beneath, the head pipe 21 and above, e.g. directly overhead of, the front frame portion 22 may be focused on.

Specifically, the space formed below, e.g. directly beneath, the head pipe 21 and above, e.g. directly overhead of, the front frame portion 22 can be effectively and flexibly used, the main switch unit 50 having the main switch portion 51 and being in a certain degree of size is disposed in, on or to the rear of the head pipe 21, and at least a part of the main switch unit 50 is located further forward than the imaginary line A that connects the rear end of the upper or uppermost edge portion of the head pipe 21 and the rear end of the lower or lowermost edge portion of the front frame portion 22, so that impact on the size of the foot placing space in the front-rear direction due to the disposition of the main switch unit 50 is reduced.

Further, on the premise of ensuring the size of the foot placing space in the front-rear direction, when the main switch unit 50 is disposed in, on or to the rear of the head pipe 21, and the storage portion 40 is formed to at least one side of right and left of the main switch unit 50, the storage portion 40 is not affected by the disposition of the main switch unit, which can sufficiently ensure the size of the storing space.

On the basis of the above, this implementation form of the present invention can provide a scooter-type vehicle that is highly comfortable for a rider, which, on the one hand, can ensure foot placing space of a flat-shaped pedal or footboard 33 in a front-rear direction, and on the other hand, can ensure storing space for storing and taking articles by hand when the rider is in a riding state.

Other Implementation Forms

In the foregoing embodiment, a main switch unit includes a main switch portion and a locking mechanism, the main switch portion having an operating portion, that is, a key insertion portion, and the locking mechanism locks rotation, relative to a head pipe, of a steering mechanism. However, the main switch unit of the present invention is not limited to the foregoing embodiment. It only needs to include a main switch portion having an operating portion used by a rider for operation.

For example, the main switch unit of the present invention may also have a main switch portion, and a locking unit having a locking mechanism configured to lock the rotation, relative to the head pipe, of the steering mechanism is separately formed with the main switch unit.

Moreover, for example, the main switch unit may also have a main switch portion, where the main switch portion communicates with a key unit by operating the operating portion. That is, the main switch unit of the present invention may also not use a main switch portion including a key insertion portion into which the key unit may be inserted, but use a so-called intelligent key system. In this case, the intelligent key system includes a main switch portion and a control portion, where the main switch portion has an operating portion that can be used by the rider for operation. The control portion controls, based on a signal indicating that the operating portion of the main switch portion is operated, communication between the main switch portion and the key unit. The control portion allows, based on a result of the communication with the key unit, a main power supply to be started. Moreover, the operating portion of the main switch portion may be of various structures such as a knob-type structure and a button-type structure. In addition, an antenna used to communicate with the key unit may be integrally formed with the main switch portion, or may be separately formed. Further, in a case in which the intelligent key system is used, the vehicle cover is not limited by the foregoing embodiment, and various designs may be changed based on installation of the intelligent key system.

The foregoing describes the embodiments of the present invention, but a person in the art can make various design changes based on the present invention without departing from the scope of the present invention. Therefore, the protection scope of the present invention is not limited to the foregoing embodiments, but also includes various design changes within the scope of the claims of the present invention without departing from the present invention.

The invention claimed is:

1. A scooter-type vehicle, comprising:
   a front wheel;
   a steering mechanism, comprising a handle for a rider to operate, the steering mechanism supporting the front wheel;
   a vehicle frame, comprising a head pipe, a front frame portion, and a rear frame portion, the head pipe rotatably supporting the steering mechanism and extending in a direction forwards and downwards with respect to the vehicle, the front frame portion extending in a direction rearwards and downwards with respect to the vehicle from a rear portion of the head pipe, and in a front view, being disposed so as to overlap the front wheel when the steering mechanism is in a non-rotating state, and the rear frame portion extending rearwards from a lower portion of the front frame portion;
   a saddle portion being supported by the rear frame portion;
   a vehicle cover comprising a flat-shaped pedal or footboard and a front cover portion, the flat-shaped pedal or footboard being located further forward than the saddle portion above the rear frame portion, and being used by the rider sitting on the saddle portion to place feet on, and the front cover portion extending upwards from a front end of the flat-shaped pedal or footboard, and being located to the rear of the head pipe and the front frame portion; and
   a main switch unit, having a main switch portion, the main switch portion having an operating portion used by the rider for operation; and
   the main switch unit being located to the rear of the head pipe, and in a side view of the vehicle, being disposed such that at least a part thereof is further forward than an imaginary line that connects a rear end of an upper or uppermost edge portion of the head pipe and a rear end of a lower or lowermost edge portion of the front frame portion, and
   the front cover portion comprising a storage portion, the storage portion being located to at least one side of further right and left than the operating portion and having an opening at an upper side.

2. The scooter-type vehicle according to claim 1, wherein in the side view of the vehicle the operating portion is disposed in a position lower than a seat surface of the saddle portion.

3. The scooter-type vehicle according to claim 2, further comprising a key unit, the key unit being configured to operate the operating portion of the main switch portion, and the operating portion being a key insertion portion for the key unit to be inserted in.

4. The scooter-type vehicle according to claim 2, further comprising a key unit that can communicate with the main switch portion, the main switch portion communicating with the key unit by operating the operating portion.

5. The scooter-type vehicle according to claim 1, wherein in the side view of the vehicle at least part of the storage portion is disposed in a position overlapping the main switch unit in an up-down direction and/or in a front-rear direction.

6. The scooter-type vehicle according to claim 5, further comprising a key unit, the key unit being configured to operate the operating portion of the main switch portion, and the operating portion being a key insertion portion for the key unit to be inserted in.

7. The scooter-type vehicle according to claim 5, further comprising a key unit that can communicate with the main switch portion, the main switch portion communicating with the key unit by operating the operating portion.

8. The scooter-type vehicle according to claim 1, wherein a lower or lowermost end portion of the main switch unit is located further forward with respect to the vehicle than an upper or uppermost end portion of the main switch unit.

9. The scooter-type vehicle according to claim 8, further comprising a key unit, the key unit being configured to operate the operating portion of the main switch portion, and the operating portion being a key insertion portion for the key unit to be inserted in.

10. The scooter-type vehicle according to claim 8, further comprising a key unit that can communicate with the main switch portion, the main switch portion communicating with the key unit by operating the operating portion.

11. The scooter-type vehicle according to claim 1, further comprising a hook, the hook being installed in or on the main switch unit from the rear of the main switch unit.

12. The scooter-type vehicle according to claim 11, further comprising a key unit, the key unit being configured to operate the operating portion of the main switch portion, and the operating portion being a key insertion portion for the key unit to be inserted in.

13. The scooter-type vehicle according to claim 11, further comprising a key unit that can communicate with the main switch portion, the main switch portion communicating with the key unit by operating the operating portion.

14. The scooter-type vehicle according to claim 1, wherein the main switch unit further comprises a locking mechanism that locks rotation relative to the head pipe of the steering mechanism.

15. The scooter-type vehicle according to claim 14, further comprising a key unit, the key unit being configured to operate the operating portion of the main switch portion, and the operating portion being a key insertion portion for the key unit to be inserted in.

16. The scooter-type vehicle according to claim 14, further comprising a key unit that can communicate with the main switch portion, the main switch portion communicating with the key unit by operating the operating portion.

17. The scooter-type vehicle according to claim 1, further comprising a key unit, the key unit being configured to operate the operating portion of the main switch portion, and the operating portion being a key insertion portion for the key unit to be inserted in.

18. The scooter-type vehicle according to claim 1, further comprising a key unit that can communicate with the main switch portion, the main switch portion communicating with the key unit by operating the operating portion.

19. The scooter-type vehicle according to claim 1, wherein in the side view of the vehicle at least part of the storage portion overlaps the head pipe in the up-down direction.

* * * * *